(12) United States Patent  
Tanabe

(10) Patent No.: US 7,896,733 B2
(45) Date of Patent: Mar. 1, 2011

(54) METHOD AND APPARATUS FOR PROVIDING INTERESTING AND EXCITING VIDEO GAME PLAY USING A STABILITY/ENERGY METER

(75) Inventor: Kensuke Tanabe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 844 days.

(21) Appl. No.: 11/532,003

(22) Filed: Sep. 14, 2006

(65) Prior Publication Data

US 2008/0070655 A1     Mar. 20, 2008

(51) Int. Cl.
*A63F 9/24*     (2006.01)

(52) U.S. Cl. ............. 463/7; 463/2; 463/5; 463/8; 463/50

(58) Field of Classification Search ............... 463/2, 5, 463/7, 8, 6, 50
See application file for complete search history.

(56) References Cited

U.S. PATENT DOCUMENTS

| | | | |
|---|---|---|---|
| 5,001,632 A | 3/1991 | Hall-Tipping | |
| RE34,728 E | 9/1994 | Hall-Tipping | |
| 5,601,487 A | 2/1997 | Oshima et al. | |
| 6,155,924 A | 12/2000 | Nakagawa et al. | |
| 6,439,998 B1 | 8/2002 | Itou | |
| 6,595,850 B2 | 7/2003 | Yamaki | |
| 6,709,334 B1 | 3/2004 | Miyagawa et al. | |
| 6,935,954 B2 | 8/2005 | Sterchi et al. | |
| 2003/0207712 A1 | 11/2003 | Sterchi et al. | |

OTHER PUBLICATIONS

Mark Ryan, Doom 3, Aug. 20, 2004, http://faqs.ign.com/articles/540/540767p1.html , pp. 2,5.*
Koji Akibayashi, Heavy Barrel Nov. 16, 2009, http://arcade-history.com/?n=heavy-barrel&page=detail&id=1108 , p. 2.*
Kurt Kalata, Rambo MSX, http://hg101.kontek.net/rambo/rambo.htm , p. 5.*

\* cited by examiner

*Primary Examiner* — Dmitry Suhol
*Assistant Examiner* — Brandon Gray
(74) *Attorney, Agent, or Firm* — Nixon & Vanderhye, PC

(57) ABSTRACT

A power or life meter is displayed in a video game. Firing a weapon depletes the indicated power. Meanwhile, the power is recharged at a predetermined rate. If the indicated power exceeds capacity, the game character is adversely impacted. If the indicated power is completely depleted, the game character loses a benefit.

17 Claims, 7 Drawing Sheets

NON-LIMITING
EXAMPLE GAME SYSTEM

NON-LIMITING EXAMPLE CONTROLLER

NON-LIMITING EXAMPLE CONTROLLER

METHOD AND APPARATUS FOR PROVIDING INTERESTING AND EXCITING VIDEO GAME PLAY USING A STABILITY/ENERGY METER

FIELD

The technology herein relates to video games, and more particularly to special game player modes that temporarily increase the capability of game characters to perform tasks. In more detail, the technology herein relates to a hyper mode that imbues a game character with invulnerability, strength or power while simultaneously creating a risk of adverse consequences.

BACKGROUND AND SUMMARY

We are all intrigued by what it would be like to have special powers. Superman, Spiderman and Batman cartoons, comic books, radio shows, television shows and motion pictures have captured the imagination of generations of youngsters. But the idea of human-like entities having invulnerability and special powers extends back into the dim mists of ancient history. The Greeks worshiped gods on Mount Olympus with special powers, and Homer wrote about warriors such as Achilles who was invulnerable except for his heel.

Video games have continued this long tradition by providing special modes that enhance the game character capabilities. If a game character completes certain challenges, he or she may be given a period of strength or invulnerability that will allow game character to accomplish "super-human" tasks. Some games have even provided evolutionary processes by which game characters can transform such as from a caterpillar to a butterfly and leave the ground to accomplish wonderful things up in the sky.

While much work and investigation has been done in the past to make video and computer game play more interesting, further improvements and interesting new features are typically sought after.

The technology herein provides a special game player mode ("hyper-mode") which provides a game player with a period of strength or invulnerability. When a game player has entered the "hyper-mode", a power meter is displayed on the screen. The power meter provides an indication of a power reservoir the game character can use to accomplish one or more tasks. In one specific exemplary illustrative non-limiting implementation, the power meter provides a power reservoir indication that the game character uses up by firing one or more weapons, and thus functions as sort of an "ammo" (ammunition) gauge.

In the exemplary illustrative non-limiting implementation, the game character can use up the power reservoir indicated by the power meter by firing a weapon. Meanwhile, however, the game automatically and continually replenishes the power reservoir at a predetermined rate. If the amount of power contained within the power reservoir ever exceeds a predetermined threshold based on such continual replenishment, the game player suffers a detrimental impact. In one exemplary illustrative non-limiting implementation, the game character dies whenever a power overload occurs.

In one exemplary illustrative non-limiting implementation, such as a fighting game, a game character in the "hyper mode" is invulnerable and can attack enemies without fear of being injured or killed. The displayed power meter continually shows an available reservoir of fire power that the game character can use to fire weapons at the enemy. If the power meter falls to zero showing complete depletion, the game character loses the benefit of the invulnerability provided by hyper mode and once again becomes vulnerable to enemy attack. Meanwhile, however, the power reservoir is constantly refilled at a predetermined rate (the rate may be beyond the game player's control). If the capacity of the power meter is exceeded, the game character is destroyed by his own instability.

In one exemplary illustrative non-limiting implementation, the same or similar power meter can be used for normal mode game play as well as hyper mode game play. In the normal mode, the power meter or other indicator displays an amount of power or life remaining. One block or graduation of the indicated power meter could, for example, corresponding to some number of score points such as 100 points. In one exemplary illustrative non-limiting implementation, the game player can enter into hyper mode at will by using for example one block or graduation of power or life indicated by the power meter.

In one exemplary illustrative non-limiting implementation, upon entering the hyper mode, the hyper mode gauge displays remaining energy that the game player can use to fire weapons at enemies. The hyper mode may or may not have a preset duration of a particular amount of time. The duration of hypermode decreases as the amount of energy indicated on the gauge decreases. Thus, for example, if the game player uses up the energy indicated by the gauge by firing his or her weapons often, he or she may decrease how much time the game character enjoys the benefits of hyper mode. However, the game may automatically replenish the energy indicated by the gauge at a predetermined rate, and so the amount of energy indicated by the gauge will increase if the game player does not fire weapons for awhile. If the gauge ever exceeds a maximum capacity threshold after the character enters hyper mode, the game is over.

In the exemplary illustrative non-limiting implementation, the game player must carefully shoot game objects while watching the hyper mode gauge to ensure the gauge does not ever become overfilled or "maxed out". If the amount of energy indicated by the gauge is ever completely depleted, hyper mode is over and the game player is no longer imbued with special powers such as for example vulnerability. On the other hand, if the amount of energy indicated by the gauge ever exceeds a predetermined maximum, the game character may suffer a setback or other negative event including for example destruction.

BRIEF DESCRIPTION OF THE DRAWINGS

These and other features and advantages of exemplary illustrative non-limiting implementations will be better and more completely understood by referring to the following detailed description in conjunction with the drawings of which.

DETAILED DESCRIPTION

Techniques described herein can be performed on any type of computer graphics system including a personal computer, a home video game machine, a portable video game machine, a networked server and display, a cellular telephone, a personal digital assistant, or any other type of device or arrangement having computation and graphical display capabilities. One exemplary illustrative non-limiting implementation includes a home video game system such as the Nintendo Wii 3D video game system, a Nintendo DS or other 3D capable interactive computer graphics display system. One exemplary illustrative non-limiting implementation is described below, but other implementations are possible.

Exemplary Video Game Platform

Figure 1:
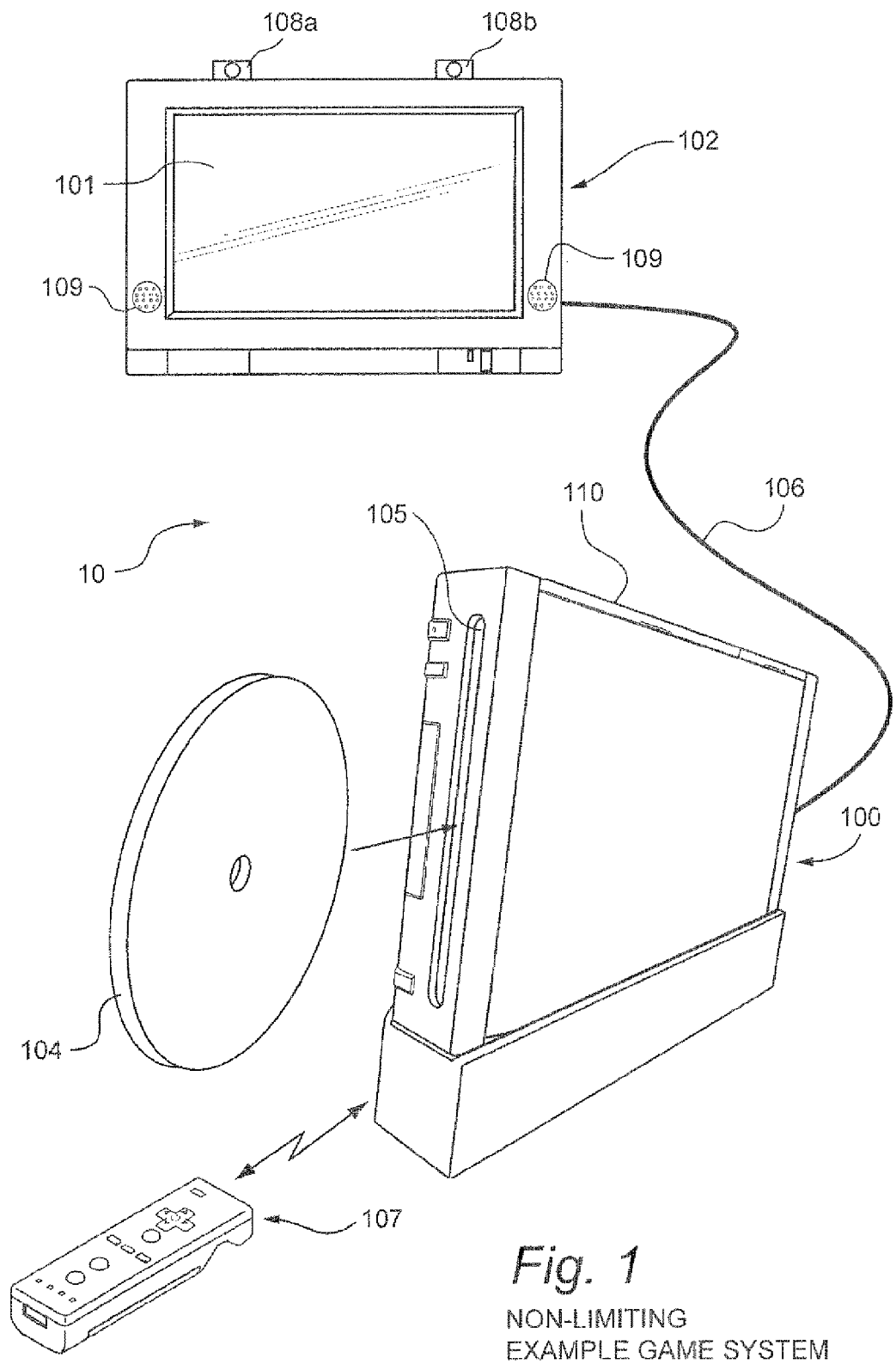
FIG. 1 shows an exemplary external view of a non-limiting interactive computer graphics system in the form of a home video game apparatus for executing a game program.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display 101 of television 102 to which game console 100 is connected by cable 106. Audio associated with the game program or other application is output via speakers 109 of television 102. While an optical disk is shown in FIG. 1 for use in storing video game software, the game program or other application may alternatively or additionally be stored on other storage media such as semiconductor memories, magneto-optical memories, magnetic memories and the like and/or downloaded over a network or by other means.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Preferably, a center point between light-emitting devices 108a and 108b is aligned with a vertical center line of television 101. The images from light-emitting devices 108a and 108b can be used to determine a direction in which controller 107 is pointing as well as a distance of controller 107 from display 101. By way of example without limitation, light-emitting devices 108a and 108b may be implemented as two LED modules (hereinafter, referred to as "markers") provided in the vicinity of a display screen of television 102. The markers each output infrared light and the imaging information calculation section of controller 107 detects the light output from the LED modules to determine a direction in which controller 107 is pointing and a distance of controller 107 from display 101 as mentioned above. As will become apparent from the description below, various implementations of the system and method for simulating the striking of an object described herein do not require use such markers.

Although markers 108a and 108b are shown in FIG. 1 as being above television 100, they may also be positioned below television 100 or in other configurations.

Figure 2:
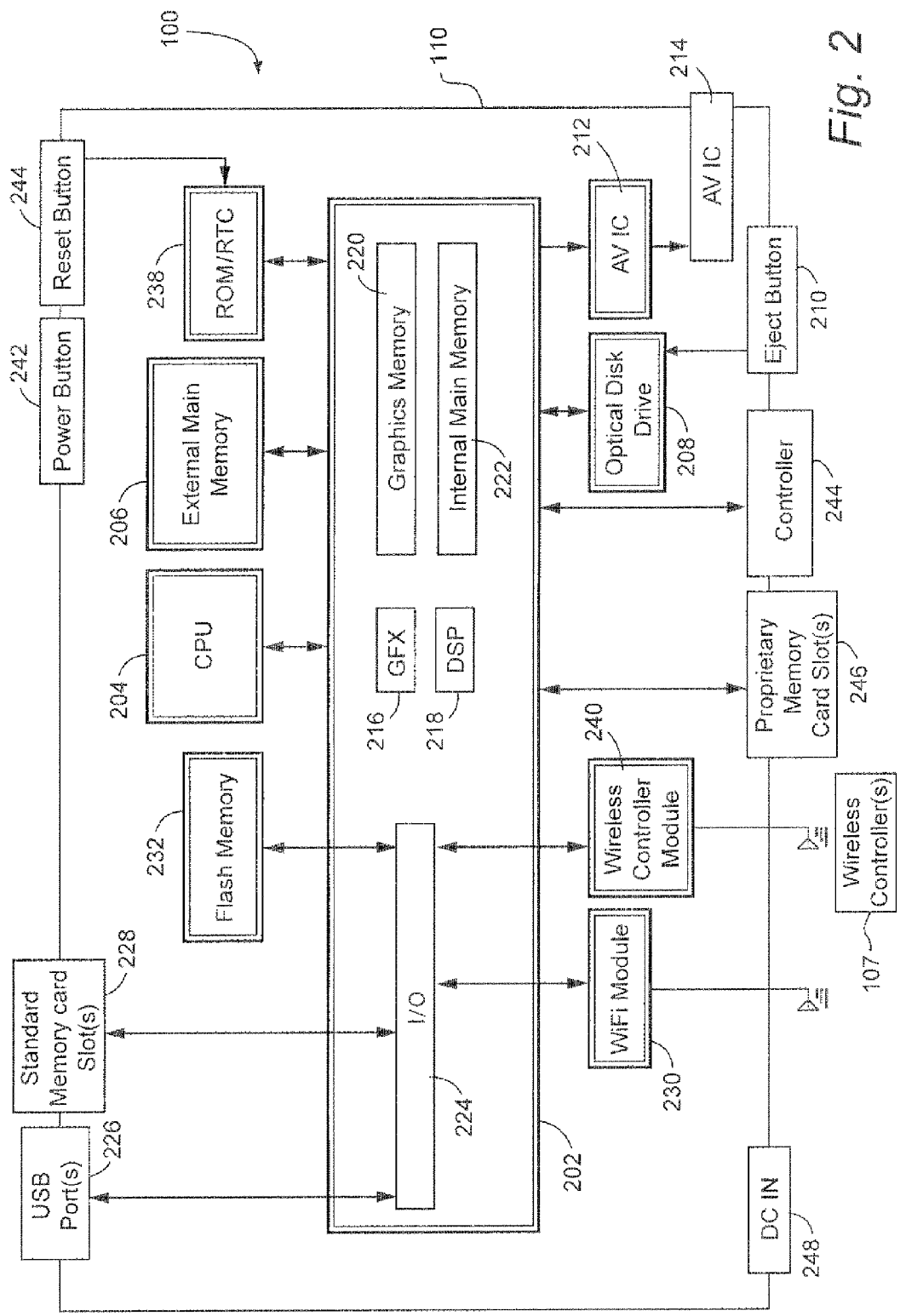
FIG. 2 is a block diagram showing an internal structure of the game apparatus.

With reference to the block diagram of FIG. 2, game console 100 includes a RISC central processing unit (CPU) 204 for executing various types of applications including (but not limited to) video game programs. CPU 204 executes a boot program stored in a boot ROM (not shown) to initialize game console 100 and then executes an application (or applications) stored on optical disc 104 which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed for execution by CPU 204 and graphics processor 216 and optical disks of a second type (e.g., of a second size and/or a second data structure) containing applications originally developed for execution by a different CPU and/or graphics processor. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module may also be used for communication with other game devices such as suitably-equipped hand-held game devices. Module 230 is referred to herein as "WiFi", which is generally used in connection with the family of IEEE 802.11 specifications. However, game console 100 may of course alternatively or additionally use wireless modules that conform with other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected to controller 107 and controller 107 could transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry. By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the consoled off so as to reduce the possibility of inadvertently turn-off. Reset button 244 is used to reset (reboot) game console 100.

Figure 3A:
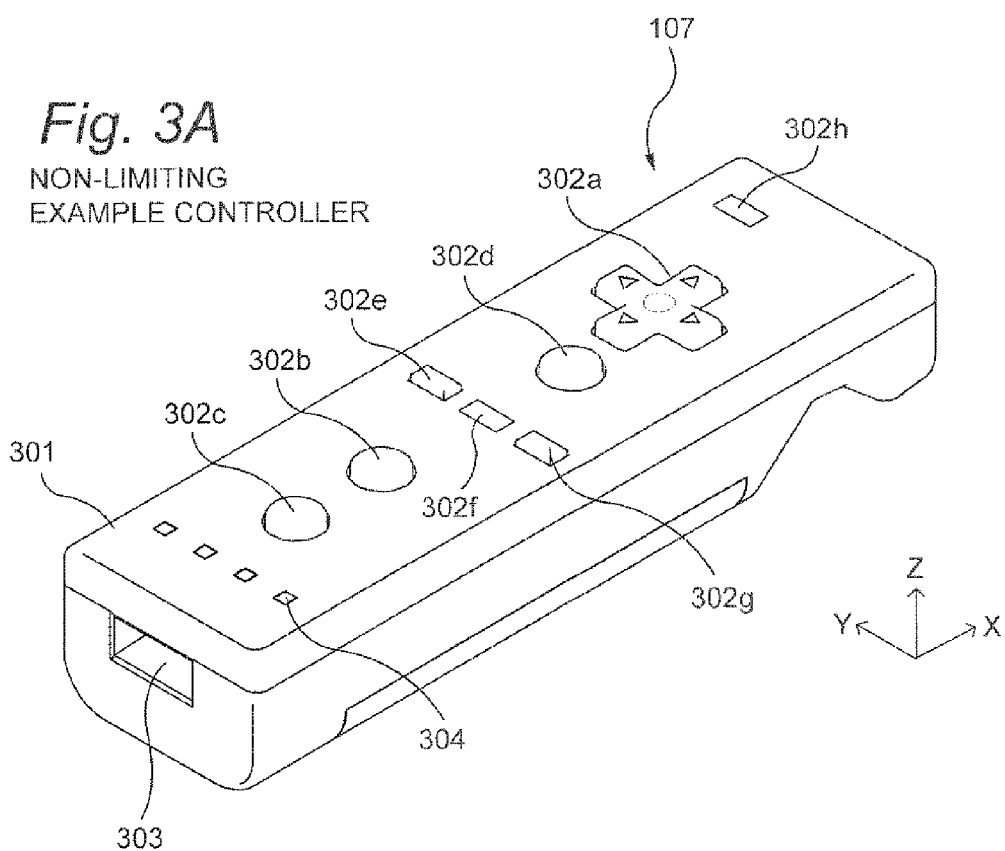
FIGS. 3A, 3B and 4 show different views of an exemplary illustrative non-limiting handheld controller for the video game system of FIG. 1.
Figure 3B:
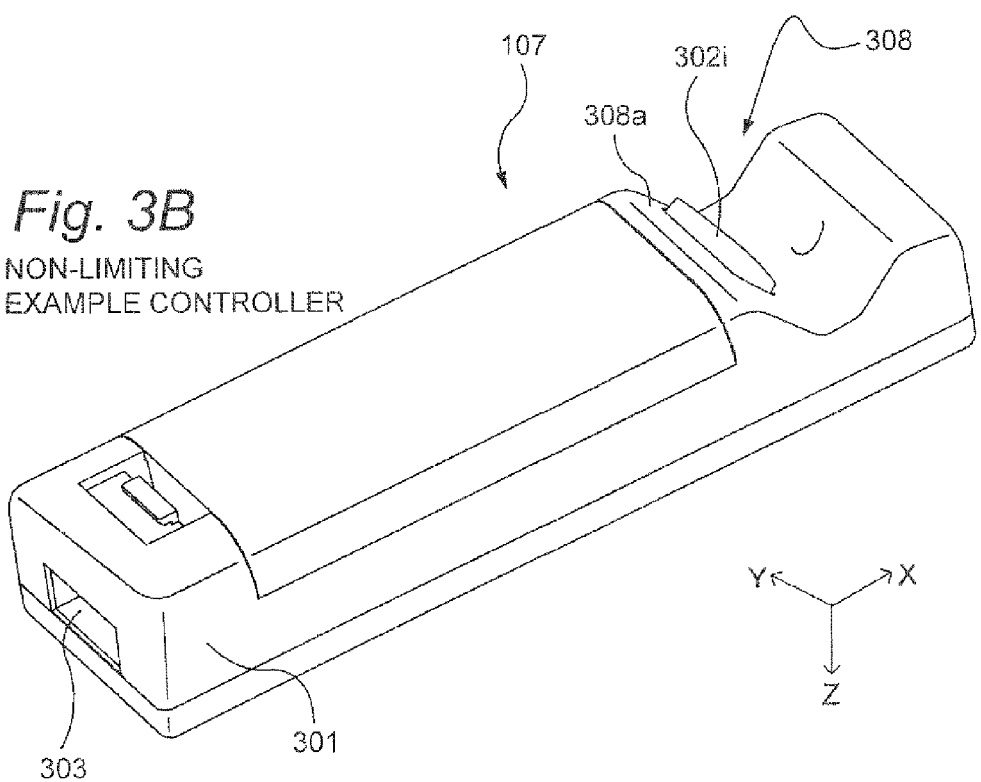
Figure 4:
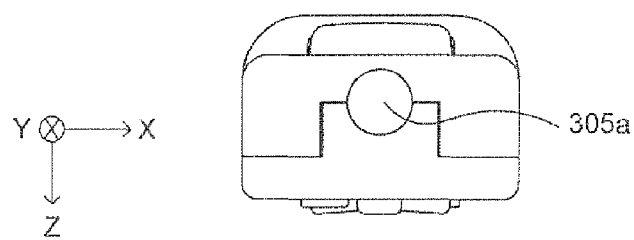

With reference to FIGS. 3 and 4, example controller 107 includes a housing 301 on which operating controls 302a-302h are provided. Housing 301 has a generally parallelepiped shape and is sized to be conveniently holdable in a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player may be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from the other controllers used with game console 100 and LEDs may 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of an imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. The techniques described herein of simulating the striking of an object can be achieved without using information from imaging information calculation section 305, and thus further detailed description of the operation of this section is omitted. Additional details may be found in Application No. 60/716,937, entitled "VIDEO GAME SYSTEM WITH WIRELESS MODULAR HANDHELD CONTROLLER," filed on Sep. 15, 2005; 60/732,648, entitled "INFORMATION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5:
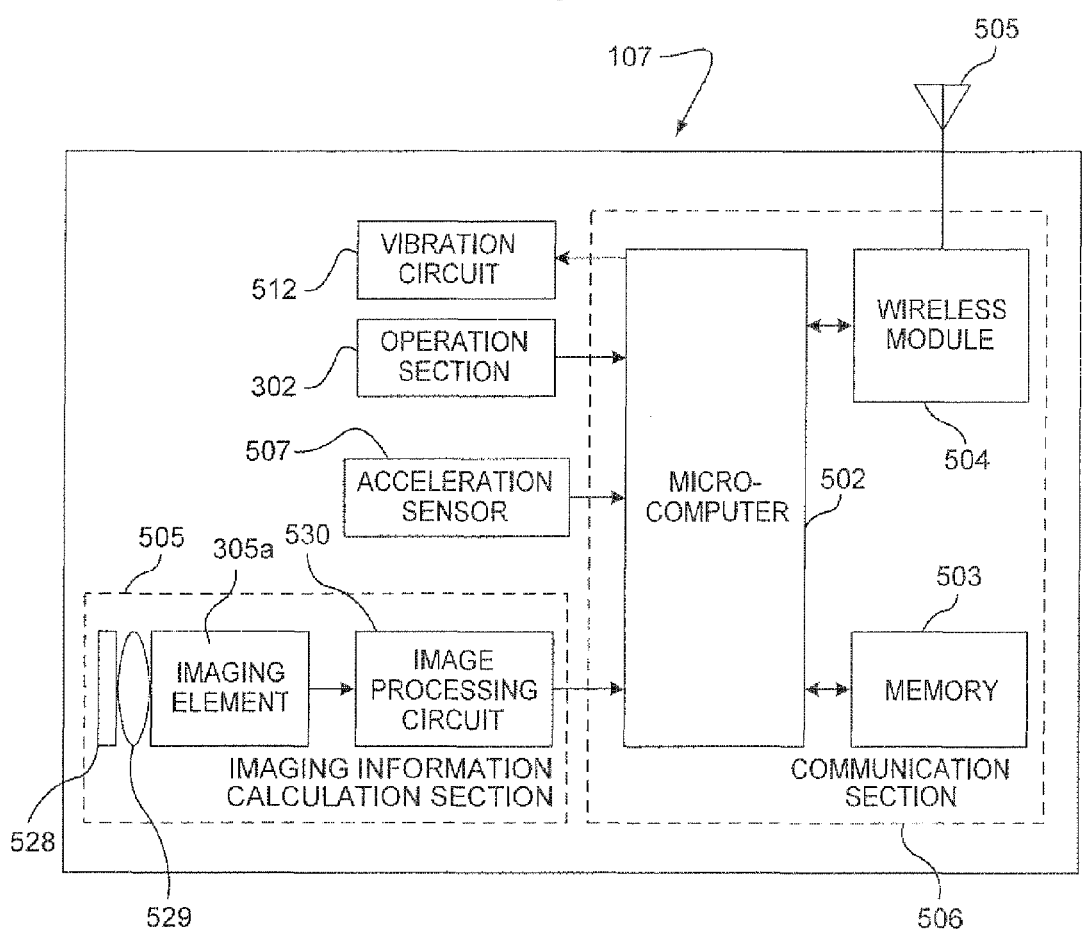
FIG. 5 is a block diagram of an exemplary illustrative non-limiting implementation of the handheld controller.

As shown in the block diagram of FIG. 5, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis may be used or a one-axis linear accelerometer that only detects linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, image information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player holding controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at a predetermined time interval. Because game processing is generally performed at a cycle of ⅟₆₀ sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

The exemplary illustrative non-limiting system described above can be used to execute software stored on optical disk 104 or in other memory that controls it to interactive generate displays on display 101 of a progressively deformed object in response to user input provided via controller 107. Exemplary illustrative non-limiting software controlled techniques for generating such displays will now be described.

Example Hyper Mode Game Play

Figure 6:
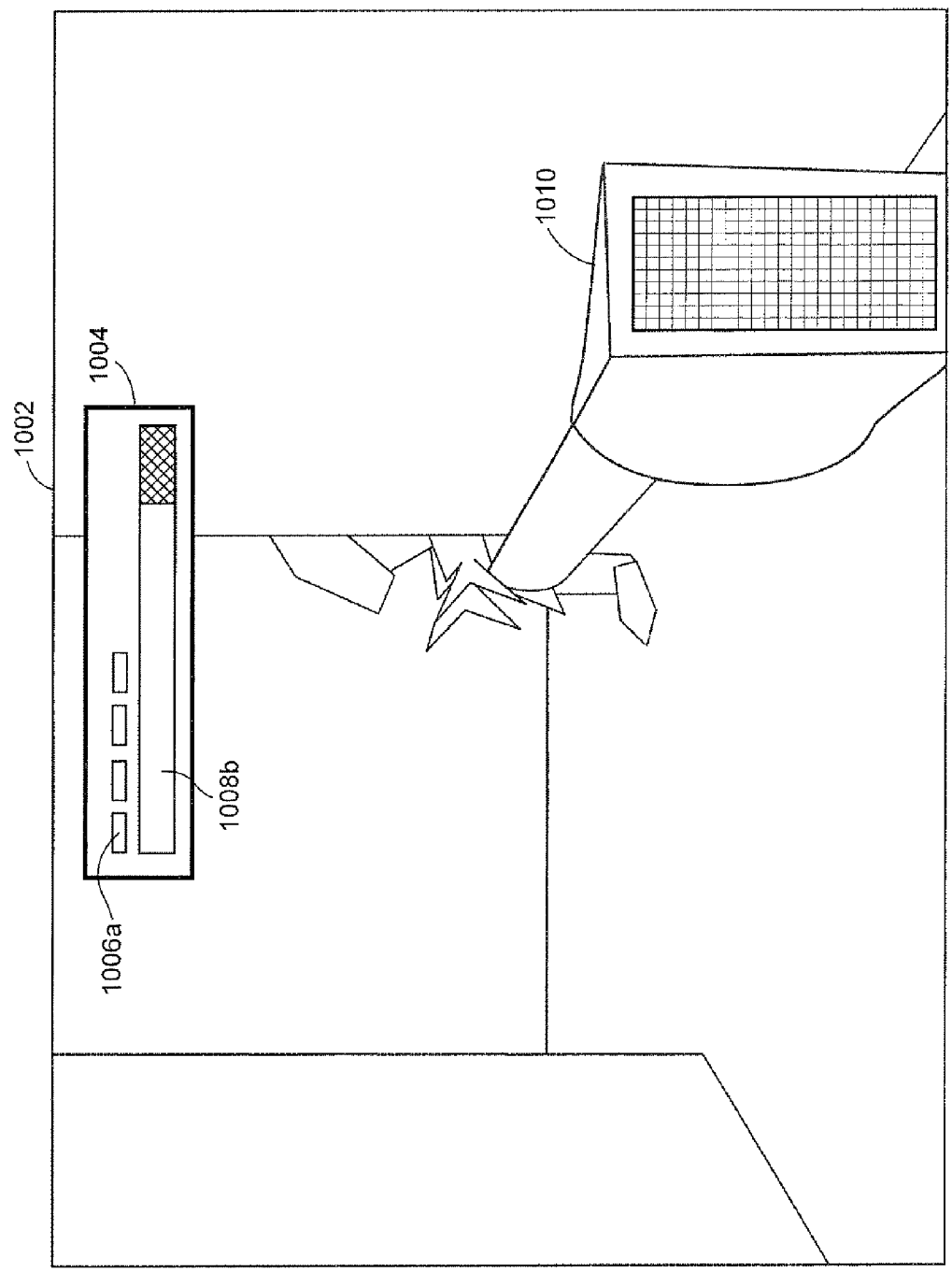
FIG. 6 shows an example illustrative non-limiting general game display.

FIG. 6 shows an example screen display 1002 of a first person shooter type combat game. Other types of games including driving games, space games, adventure games, sports games or any other type of game could also be used. In the example shown, a power or life meter or gauge 1004 is displayed on display 1002. Gauge 1004 includes a block indicator 1006 and a power gauge indicator 1008. The block indicator 1006 can display for example a block of life or power (one block may correspond to some number of points such as for example 100 points). The power gauge indicator 1008 reflects the amount of power a player has available. Blocks can be earned by accomplishing particular tasks within the game for example.

In one exemplary illustrative non-limiting implementation, the game indicator 1008 is similar to a thermometer or for example the type of graphical display provided by an audio graphic equalizer. One can readily tell by looking at the gauge how much power a game player has and how much power has been depleted. In one example non-limiting implementation, the gauge level rises (e.g., moves to the right or upwards) as the amount of stored power in a power reservoir increases and moves to the left or downwards as the amount of power decreases. Generally, the game player wishes to maintain sufficient power as indicated by the power gauge to accomplish gaming tasks.

FIG. 6 also shows a weapon 1010. In the exemplary illustrative non-limiting implementation, each time the game character fires weapon 1010, the power indicated by the gauge 1008 decreases. If the gauge ever falls to zero level and thus becomes completely depleted, the game character may no longer be able to fire weapon 1010 and can no longer attack enemies. The game character can obtain power for display by indicator 1008 automatically as time goes by and/or by accomplishing certain tasks.

In one exemplary illustrative non-limiting implementation, the game player can choose to enter a special mode called "hyper mode" by depressing a control or menu selection. In one exemplary illustrative non-limiting implementation, it may cost the game character some power (one block) to enter hyper mode. However, certain benefits are achieved in hyper mode. For example, in one exemplary illustrative non-limiting implementation, the game character becomes less vulnerable or invulnerable to enemy attack whenever the game character is in hyper mode.

Figure 7:
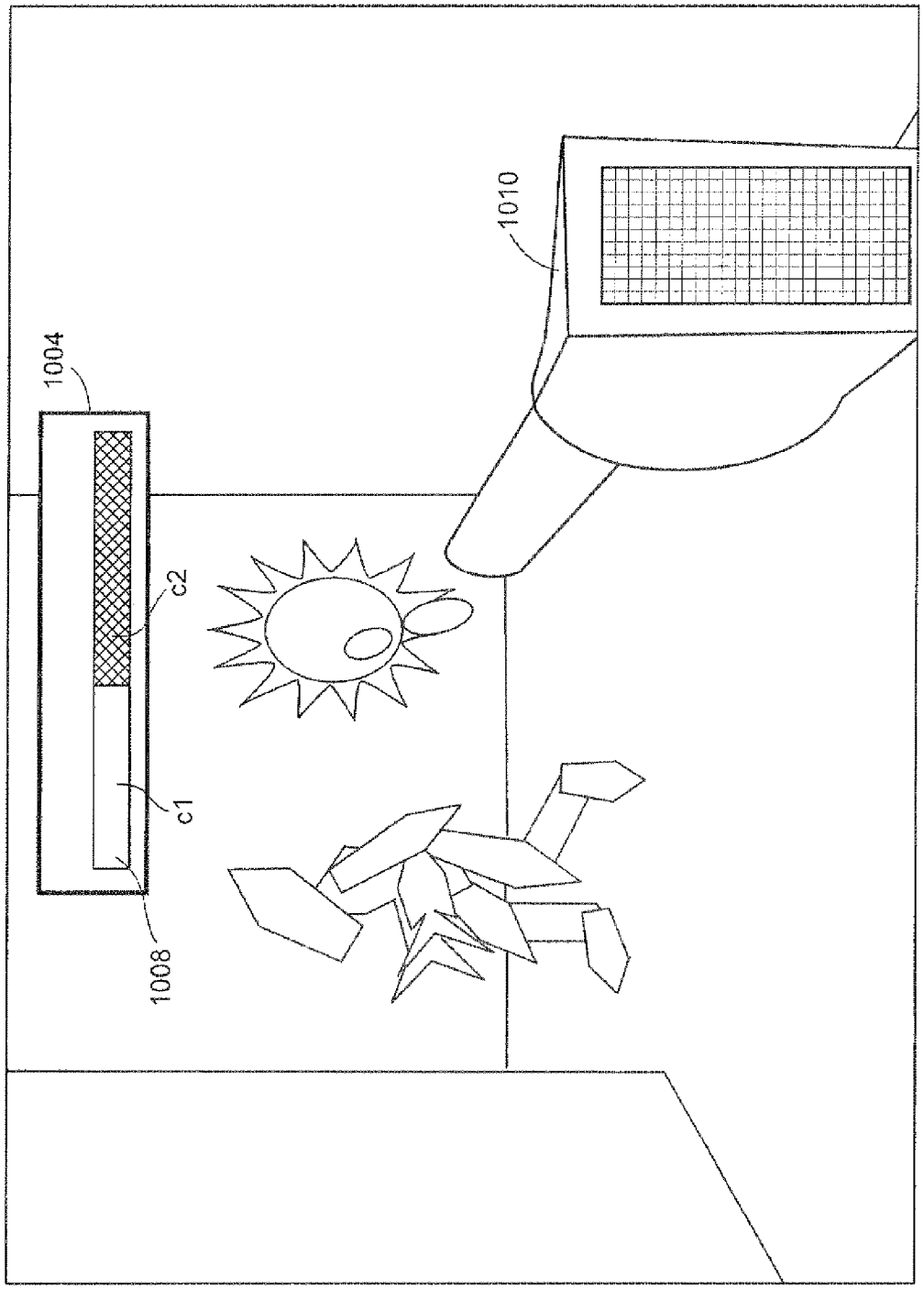
FIG. 7 shows an example illustrative non-limiting hyper mode game display.

FIG. 7 shows an example illustrative non-limiting hyper mode game display. In this example illustration, the gauge 1004 continues to provide a gauge indicator 1008 indicating the amount of power available and stored in a power reservoir. In the example shown, the "C1" part of the gauge indicator 1008 indicates the remaining energy available for shooting a weapon, and the "C2" portion of the gauge indicator indicates the amount of energy that has been used or depleted. In one exemplary illustrative non-limiting implementation, when the game character first enters hyper mode, the gauge indicator 1008 is filled to an intermediate level. Each time the game player fires weapon 1010, the amount of power indicated by gauge indicator 1008 decreases. If the "C1" bar indicator ever falls to zero, meaning that the energy has been entirely depleted, hyper mode is over and the game character again becomes vulnerable. However, if the game player does not fire weapon 1010 for a while, the game play automatically replenishes the energy within the indicator gauge 1008 and the "C1" bar increases in size.

In the exemplary illustrative non-limiting implementation, if the "C1" bar every exceeds a predetermined level (e.g., extends over the entirety of the gauge to indicate for example maximum capacity has been exceeded), the game is over.

In the exemplary illustrative non-limiting implementation, the game player must carefully shoot game objects with weapons 1010 while watching the indicator gauge 1008 carefully so that it never exceeds its capacity. The game player must thus maintain a situation such that both a "C1" and a "C2" portion of the gauge exists in the indication in order to maintain the game character within hyper mode but not causing a "game over" situation. This provides an interesting ebb and flow to the game action. Inexperienced players may immediately recognize the danger in remaining in hyper mode and try and leave hyper mode as rapidly as possible in order to eliminate the danger of "game over." More experienced players will recognize the advantages in terms of invulnerability or other beneficial effects of remaining in hyper mode as long as possible but must always be mindful of the danger of a "game over" should the power meter indicate energy capacity has been exceeded. The experienced player can fire a weapon periodically to decrease energy levels but does not want to deplete the energy so much that hyper mode will be over or so that there will be no power left for firing a weapon defensively. A game player will thus constantly be conducting a risk/benefit analysis in which weapon firing will increase the likelihood of leaving hyper mode but may also prevent instability that could lead to destruction. The "shoot and recharge, shoot and recharge" ebb and flow strategies that experienced players will adopt provide an interesting and fun addition to a first person shooter or other game.

Figure 8:
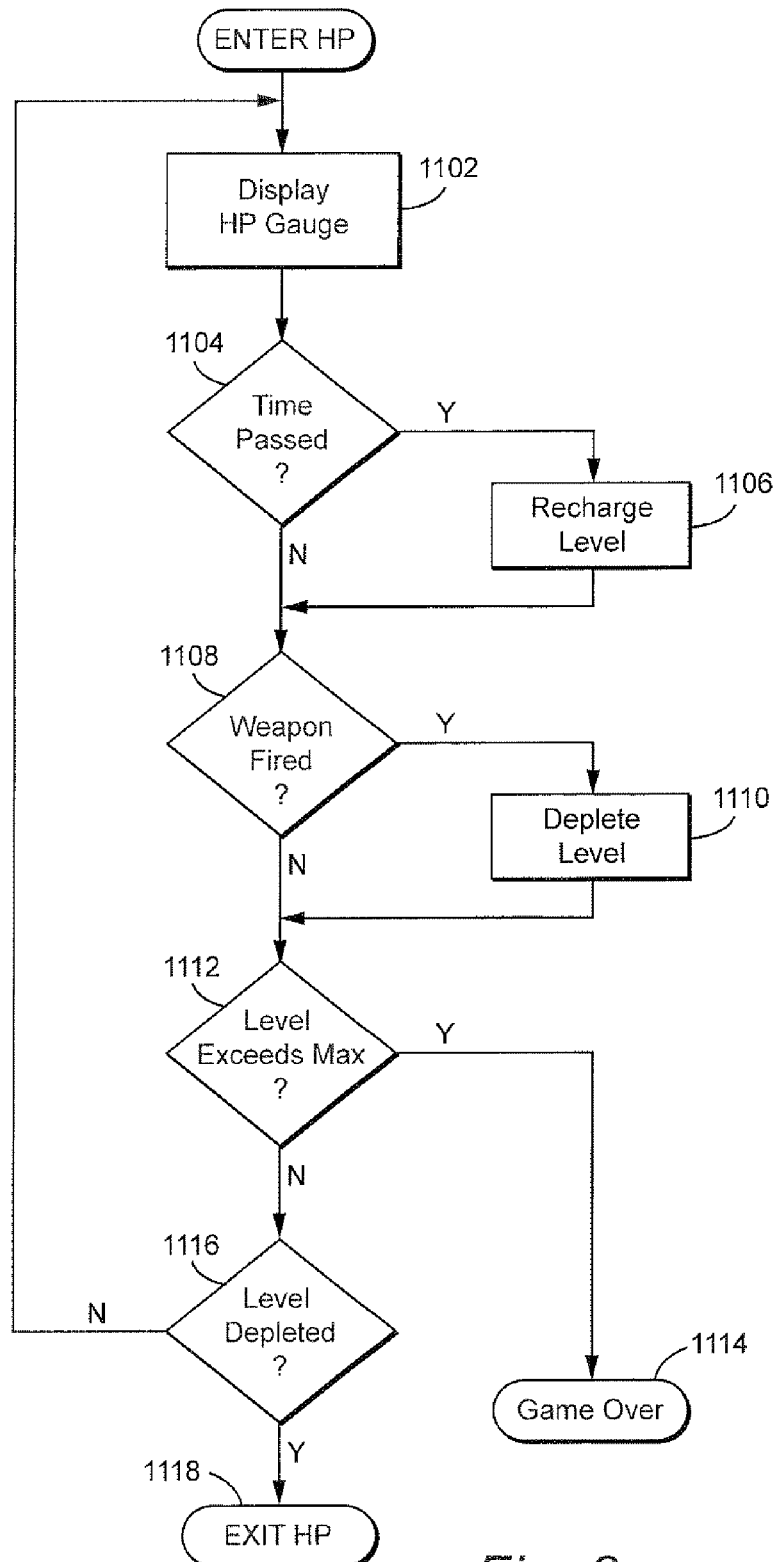
FIG. 8 is a flowchart of exemplary illustrative non-limiting program control steps.

FIG. 8 is a flowchart of exemplary illustrative non-limiting program control steps. The gauge is displayed at block 1102. As time passes, the gauge level is recharged (blocks 1104, 1106). The gauge level is depleted each time the player fires a weapon (block 1108, 1110). If the gauge level ever exceeds a predetermined maximum, the game is over (blocks 1112, 1114). If the gauge level is ever completed depleted, hyper mode is exited and the player returns to normal game play (blocks 1116, 1118).

While the technology herein has been described in connection with exemplary illustrative non-limiting implementations, the invention is not to be limited by the disclosure. For example, while the exemplary illustrative non-limiting implementation displays a gauge, other forms of indication are possible such as brightness or sound. The special powers existing in hypermode can be any time of benefit including ability to score more easily, ability to accomplish any sort of task, or any special condition or characteristic. The adverse consequence of exceeding maximum power could be any adverse consequence. The invention is intended to be defined by the claims and to cover all corresponding and equivalent arrangements whether or not specifically disclosed herein.

I claim:

1. A video game play method for use with a video game system including a processor, a display, at least one user input device, and a graphics processor configured to produce animated graphics at least in part in response to the least one user input device for display on the display, the method comprising:
   causing said processor to operate with a display, at least one user input device and a graphics processor to:
   display a power meter providing a power indication on a single scale;
   automatically replenishing the power indication displayed on the single scale by the power meter without requiring user input;
   depleting the power indication displayed on the single scale by the power meter based at least in part on game player inputs;
   comparing the power indication displayed by the power meter on the single scale to a first predetermined threshold and to a second predetermined threshold different from the first predetermined threshold;
   if the power indication is less than the first predetermined threshold, subjecting a game character to a first consequence; and
   if the power indication is greater than the second predetermined threshold, subjecting the game character to a second consequence different from said first consequence, wherein the second consequence is an adverse consequence for the game character.

2. The method of claim 1 wherein said first consequence is to make the game character more vulnerable to attack.

3. The method of claim 1 wherein the second consequence is game over.

4. The method of claim 1 wherein the second consequence is game character destruction.

5. The method of claim 1 wherein replenishing the power indication displayed on the single scale of the power meter is accomplished through a passage of time and not based on user input.

6. The video game play method of claim 1 wherein the video game play method facilitates game player inputs to balance against the passage of time for managing the power indicated on the single scale of the power meter.

7. A video game play method for use on a video game system including a processor, a display, at least one user input device, and a graphics processor configured to produce animated graphics at least in part in response to the least one user input device for display on the display, the method comprising:
   causing said processor to operate with a display, at least one user input device and a graphics processor to:
   display a power meter providing a power indication on a single scale;
   replenishing and depleting the power indication displayed on the single scale of the power meter;
   at least one of replenishing and depleting being performed automatically without requiring user input;
   comparing the power indicated by the single scale on the power meter to a first predetermined threshold and to a second predetermined threshold different from said first predetermined threshold;
   if the power indicated by the single scale on the power meter is less than the first predetermined threshold, subjecting a game player to a first consequence; and
   if the power indicated by the single scale on the power meter is greater than the second predetermined threshold, subjecting the game player to a second consequence different from the first consequence, wherein the second consequence is an adverse consequence for the game character.

8. The method of claim 7 further comprising initiating an optional game mode in response to game player inputs, and wherein at least one of said first and second consequences terminates said optional game mode.

9. . The method of claim 8 wherein said first consequence terminates said optional game mode, and said second consequence terminates a game character.

10. The method of claim 8 further comprising transitioning out of the optional game mode if a video game play condition is met.

11. The method of claim 10 wherein the video game play condition is if the game player has spent more than a programmed amount of time in the optional game mode.

12. A non-transitory computer readable medium storing computer-readable instructions for performing a video game play method for use on a video game system including a processor, a display, at least one user input device, and a graphics processor configured to produce animated graphics at least in part in response to the least one user input device for display on the display, the stored instructions comprising instructions configured to:

display a power meter providing a power indication on a single scale;
   replenish and deplete the power indication displayed on the single scale of the power meter, at least one of replenishing and depleting being performed automatically without requiring user input;
   compare the power indication displayed on the single scale of the power meter to a first predetermined threshold and to a second predetermined threshold different from the first predetermined threshold;
   if the power indication is less than the first predetermined threshold, subject the game character to a first consequence;
   if the power indication is greater than the second predetermined threshold, subject the game character to a second consequence different from said first consequence, wherein the second consequence is an adverse consequence for the game character.

13. The medium of claim 12 wherein said instructions control said replenishing to be performed automatically without requiring user input.

14. A video game system for use by a game player, comprising:

a display circuit configured to output, to a display, a representation of a power meter having a single scale providing a power indication;
   an input controller configured to facilitate game player input from the game player;
   a processor coupled to the display circuit, the processor being configured to replenish and deplete the power indication on the single scale of the power meter, at least one of the replenishing and depleting being performed automatically without requiring user input; and
   said processor being further configured to compare the power indication on the single scale of the power meter to a first predetermined threshold and to a second predetermined threshold different from the first predetermined threshold, to provide a first consequence within the game if the power indication on the single scale of the power meter is less than the first predetermined threshold, to provide a second consequence within the game that is different from the first consequence if the power indication on the single scale of the power meter is greater than the second predetermined threshold, wherein the second consequence is an adverse consequence for the game character.

15. The video game system of claim 14 wherein said processor is further configured to replenish the power indication automatically without requiring user input.

16. A video game playing method for animating and displaying an animated object on a video game system at least in part in response to game player commands received from a game player manipulating an input device, the method comprising:

causing a processor to operate with a display, at least one user input device and a graphics processor to:
   display an indication on a single scale of a power value associated with an enhanced operational mode;
   alternately increasing and decreasing the power value, wherein the increasing is based on at least one event other than game player commands;
   comparing the power value to a first predetermined threshold and to a second predetermined threshold different from said first predetermined threshold;
   animating a first game play consequence if the power value falls below the first predetermined threshold;
   animating a second game play consequence different from said first game play sequence if the power value exceeds the second predetermined threshold, wherein the second consequence is an adverse consequence for the game character; and
   permitting said game player to provide game player commands that maintain the power value between the first power predetermined threshold and the second power predetermined threshold to thereby avoid both said first and second consequences while extending the duration of said enhanced operational mode.

17. The method of claim 16 wherein said event includes a passage of time.

* * * * *